US012526435B2

(12) United States Patent
Li

(10) Patent No.: US 12,526,435 B2
(45) Date of Patent: Jan. 13, 2026

(54) METHOD, DEVICE, STORAGE MEDIUM, AND COMPUTER PROGRAM PRODUCT FOR DETECTING IMAGE FRAME LOSS

(71) Applicant: Tencent Technology (Shenzhen) Company Limited, Shenzhen (CN)

(72) Inventor: Rui Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 468 days.

(21) Appl. No.: 17/975,517

(22) Filed: Oct. 27, 2022

(65) Prior Publication Data

US 2023/0052448 A1  Feb. 16, 2023

Related U.S. Application Data

(63) Continuation of application No. PCT/CN2022/072465, filed on Jan. 18, 2022.

(30) Foreign Application Priority Data

Jan. 26, 2021  (CN) .......................... 202110105457.9

(51) Int. Cl.
*H04N 19/176* (2014.01)
*G06T 7/11* (2017.01)
(Continued)

(52) U.S. Cl.
CPC .............. *H04N 19/176* (2014.11); *G06T 7/11* (2017.01); *G06T 7/90* (2017.01); *G06T 2207/10016* (2013.01); *G06T 2207/10024* (2013.01)

(58) Field of Classification Search
None
See application file for complete search history.

(56) References Cited

U.S. PATENT DOCUMENTS

2014/0098889 A1* 4/2014 Valdez ................. H04N 19/176
375/240.24
2016/0078793 A1* 3/2016 Aimonen ............... G09G 3/006
345/589
(Continued)

FOREIGN PATENT DOCUMENTS

CN    102065318 A  *  5/2011
CN    105611291 A  *  5/2016  ........... H04N 19/166
(Continued)

OTHER PUBLICATIONS

Tencent Technology, Extended European Search Report, EP Patent Application No. 22745085.5, Mar. 12, 2024, 10 pgs.
(Continued)

*Primary Examiner* — Amandeep Saini
*Assistant Examiner* — Caroline Tabancay Duffy
(74) *Attorney, Agent, or Firm* — Morgan, Lewis & Bockius LLP

(57) ABSTRACT

An image frame loss detection method is performed by a computer device, including: acquiring first coded data respectively corresponding to a plurality of first image frames and a color signal corresponding to at least one second image frame; obtaining second coded data corresponding to at least one second image frame generated by a terminal device through image rendering of a color signal based on the coded data respectively corresponding to the plurality of first image frames; and comparing the first coded data respectively corresponding to the plurality of first image frames with the second coded data corresponding to the at least one second image frame to determine whether a frame loss occurs. The first coded data and the second coded data each include color-coded data respectively corresponding to M image blocks of a correspond image frame, and each of the M image blocks has a color in the image frame.

15 Claims, 4 Drawing Sheets

(51) Int. Cl.
*G06T 7/90* (2017.01)
*H04N 19/89* (2014.01)

(56) References Cited

U.S. PATENT DOCUMENTS

| 2016/0165225 | A1* | 6/2016 | Djurdjevic | H04N 21/442 |
| | | | | 348/187 |
| 2018/0376169 | A1* | 12/2018 | Turmel | H04L 65/80 |
| 2019/0273841 | A1 | 9/2019 | Luo | |
| 2020/0230499 | A1* | 7/2020 | Buser | H04L 43/04 |

FOREIGN PATENT DOCUMENTS

| CN | 108632666 A | * 10/2018 | ....... H04N 21/44008 |
| CN | 109510990 A | 3/2019 | |
| CN | 110602481 A | 12/2019 | |
| CN | 111050023 A | 4/2020 | |
| CN | 111866433 A | 10/2020 | |

OTHER PUBLICATIONS

Tencent Technology, WO, PCT/CN2022/072465, Apr. 13, 2022, 4 pgs.
Tencent Technology, IPRP, PCT/CN2022/072465, Jul. 31, 2023, 5 pgs.
Tencent Technology, ISR, PCT/CN2022/072465, Apr. 13, 2022, 2 pgs.
Tencent Technology, Indian Office Action, IN Patent Application No. 202347035041, Aug. 28, 2024, 7 pgs.

* cited by examiner

METHOD, DEVICE, STORAGE MEDIUM, AND COMPUTER PROGRAM PRODUCT FOR DETECTING IMAGE FRAME LOSS

CROSS-REFERENCE TO RELATED APPLICATIONS

This application is a continuation application of PCT Patent Application No. PCT/CN2022/072465, entitled "IMAGE FRAME LOSS DETECTION METHOD, DEVICE, STORAGE MEDIUM, AND COMPUTER PROGRAM PRODUCT" filed on Jan. 18, 2022, which claims priority to Chinese Patent Application No. 202110105457.9, filed with the State Intellectual Property Office of the People's Republic of China on Jan. 26, 2021, and entitled "METHOD, APPARATUS, DEVICE, AND STORAGE MEDIUM FOR DETECTING IMAGE FRAME LOSS", all of which are incorporated herein by reference in their entirety.

FIELD OF THE TECHNOLOGY

Embodiments of this application relate to the field of artificial intelligence technologies, and in particular, to a method, a device, a storage medium, and a computer program product for detecting an image frame loss.

BACKGROUND OF THE DISCLOSURE

With the continuous development of image processing technologies, in order to meet high requirements of a user for smoothness of display of a terminal device, it is necessary to detect whether a frame loss occurs to image frames displayed on the terminal device.

In a conventional method, each of a plurality of to-be displayed image frames is assigned a color. It is determined, by successively performing training on the plurality of image frames in rotation according to different colors, whether a frame loss occurs to image frames displayed on a terminal device compared to a plurality of to-be displayed image frames.

However, when a relatively small number of image frames are used for training in rotation, it is assumed that the quantity of image frames for the training in rotation is n. For the image frames displayed on the terminal device, when n frames or a number of frames equal to a multiple of n are lost compared to the plurality of to-be displayed image frames, actual image frames currently received by the terminal device are the same as the image frames that are to be received when no frame loss occurs. Therefore, the terminal device cannot detect the frame loss, which causes low accuracy of frame loss detection.

SUMMARY

Embodiments of this application provide a method, apparatus, device, storage medium, and computer program product for detecting image frame loss.

According to a first aspect, an image frame loss detection method is performed by a computer device, the method including: acquiring first coded data respectively corresponding to a plurality of first image frames; obtaining second coded data corresponding to at least one second image frame generated by a terminal device through image rendering of a color signal based on the coded data respectively corresponding to the plurality of first image frames; and comparing the first coded data respectively corresponding to the plurality of first image frames with the second coded data corresponding to the at least one second image frame, to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a second aspect, an image frame loss detection method is performed by a terminal device, the method including: acquiring first coded data respectively corresponding to a plurality of first image frames from a server; performing image rendering on the plurality of first image frames based on the first coded data respectively corresponding to the plurality of first image frames; and displaying at least one second image frame obtained by the rendering, the at least one second image frame being configured to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a third aspect, an image frame loss detection method is performed by a server, the method including: acquiring first coded data respectively corresponding to a plurality of first image frames; and transmitting the first coded data respectively corresponding to the plurality of first image frames to a terminal device and a computer device, the first coded data respectively corresponding to the plurality of first image frames being configured to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a fourth aspect, a computer device is provided, including a first acquisition unit, a second acquisition unit, a conversion unit, and a comparison unit. The first acquisition unit is configured to acquire first coded data respectively corresponding to a plurality of first image frames. The second acquisition unit is configured to acquire a color signal corresponding to at least one second image frame collected by a photosensitive sensor, the at least one second image frame being an image frame obtained by a terminal device through image rendering based on the coded data respectively corresponding to the plurality of first image frames. The conversion unit is configured to convert the color signal corresponding to the at least one second image frame to obtain second coded data corresponding to the at least one second image frame. The comparison unit is configured to compare the first coded data respectively corresponding to the plurality of first image frames with the second coded data corresponding to the at least one second image frame, to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a fifth aspect, a terminal device is provided, including an acquisition unit, a rendering unit, and a display unit. The acquisition unit is configured to acquire first coded data respectively corresponding to a plurality of first image frames from a server. The rendering unit is configured to perform image rendering on the plurality of first image frames based on the first coded data respectively corresponding to the plurality of first image frames. The display unit is configured to display at least one second image frame obtained by the rendering, the at least one second image frame being configured to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a sixth aspect, a server is provided, including an acquisition unit and a transmission unit. The acquisition unit is configured to acquire first coded data respectively corresponding to a plurality of first image frames. The transmission unit is configured to transmit the first coded data respectively corresponding to the plurality of first image frames to a terminal device and a computer device, the first coded data respectively corresponding to the plurality of first image frames being configured to determine whether a frame loss occurs, the first coded data respectively corresponding to the plurality of first image frames and the second coded data corresponding to the at least one second image frame each including color-coded data respectively corresponding to M image blocks, M being an integer greater than 1, and each image block having a color in the image frame.

According to a seventh aspect, a computer device is provided, including: one or more processors and a memory, the memory being configured to store computer-readable instructions, the one or more processors being configured to invoke and run the computer-readable instructions stored in the memory, and cause the computer device to perform the steps of the method in the embodiments of this application.

According to an eighth aspect, one or more non-transitory computer-readable storage media are provided, configured to store computer-readable instructions, the computer-readable instructions, when executed by a processor of a computer device, causing the computer device to perform the steps of the method in the embodiments of this application.

According to a ninth aspect, a computer program product is provided, including computer-readable instructions, the computer-readable instructions causing a computer to perform the steps of the method in the embodiments of this application.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following describes the technical solutions in the embodiments of this application with reference to the accompanying drawings in the embodiments of this application. Apparently, the described embodiments are some rather than all of the embodiments of this application. For the embodiments of this application, all other embodiments obtained by a person of ordinary skill in the art without creative efforts shall fall within the protection scope of this application.

Currently, a plurality of image frames for training in rotation are transmitted to a terminal device through a cloud server. The plurality of image frames for training in rotation include a plurality of image frames of different colors. For example, image frames of 5 colors including red, blue, yellow, white, and black are transmitted for training in rotation, so that the terminal device can render and display the image frames of different colors, and then the image frame rendered by the terminal device is compared with the image frame transmitted by the server to determine whether a frame loss occurs. However, a relatively small number of image frames for training in rotation easily bring an error in frame loss detection. For example, when the training in rotation is performed on the image frame according to the 5 colors including red, blue, yellow, white, and black, after the terminal device renders and displays each image frame, it is assumed that 5 frames are actually lost after the red image frame. In this case, the terminal device is to obtain a blue image frame in a next round by rendering. In this case, the frame loss that has occurred cannot be detected.

Based on the above, the current frame loss detection technology cannot guarantee the accuracy of the frame loss detection. In order to resolve this technical problem, in this application, the image frame is partitioned into a plurality of image blocks, and each image block has a color in one image frame, so that each image frame has rich colors, thereby improving the accuracy of the frame loss detection.

Figure 1:
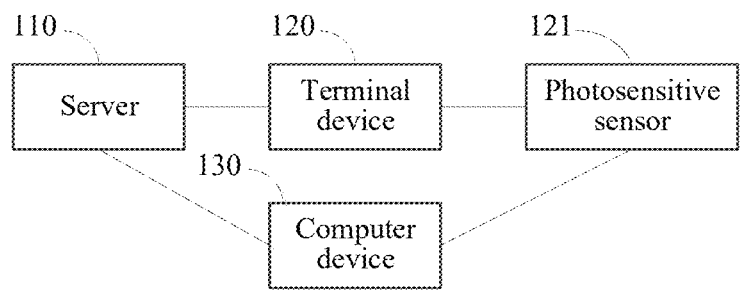
FIG. 1 is a schematic structural diagram of an image frame loss detection system according to an embodiment of this application.

FIG. 1 is a schematic structural diagram of an image frame loss detection system according to an embodiment of this application. As shown in FIG. 1, the image frame loss detection system 100 includes a server 110, a terminal device 120, and a computer device acting as a test device 130. The server 110 is respectively connected to the terminal device 120 and the computer device 130 in a wired or wireless manner. The terminal device 120 is connected to the computer device 130 in a wired or wireless manner. For example, one or more photosensitive sensors 121 may be arranged on the terminal device 120, and the photosensitive sensor 121 is connected to the computer device 130.

The server 110 may be a cloud server. In different application scenarios, the server 110 may be configured to implement different functions. For example, in a cloud gaming scenario, the server 110 may be a cloud gaming server. In this embodiment, the server 110 is configured to code colors of image blocks into which a plurality of to-be-displayed image frames are partitioned, acquire coded data respectively corresponding to the plurality of image frames, and successively transmit the coded data respectively corresponding to the plurality of image frames to the terminal device 120 and/or the computer device 130.

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scenario, the game is run on the cloud server rather than a game terminal of a player, and the cloud server renders the game scene into a video and audio stream, and transmits the video and audio stream to the game terminal of the player through a network. The game terminal of the player is not required to have powerful graphics computing and data processing capabilities, but only required to have a basic streaming media playback capability and the capability of acquiring instructions inputted by the player and transmitting the instructions to the cloud server.

Based on the above technical means, in the cloud gaming scenario, a game image run on a server end is to be transmitted to the terminal device for display. In addition to this, the server may further transmit other images to the terminal device for real-time display, for example, a stored video image, a read video image of an online program, an acquired live video image, and the like. In the process that the server transmits a plurality of image frames corresponding to the game image, a video image, and the like to a terminal device of a user in real time for display, the frame loss is caused due to the network jitter, the coding and decoding efficiency of the terminal device, and the efficiency of transmission for display, which brings the user freezing and unsmooth watching experience. Therefore, a set of quantifiable indicators are required to collect statistics on the frame loss.

The solution of this application is not limited to application to the cloud gaming test scenario, and may further be application to other scenarios where the frame loss is required to be tested for the terminal device.

Exemplarily, the terminal device 120 may be any terminal device with a display function, such as a mobile phone, a pad, a computer, a TV, a virtual reality (VR) terminal device, an augmented reality (AR) terminal device, a terminal device related to industrial control, a terminal device related to self-driving, a terminal device related to remote medical, a terminal device related to a smart city, a terminal device related to a smart home, and the like. The terminal device in this embodiment of this application may also be a wearable device. The wearable device may also be referred to as a wearable smart device, and is a collective term for wearable devices developed by intelligently designing everyday wearables based on a wearable technology, for example, glasses, gloves, a watch, clothing, and shoes. The wearable device is a portable device that is directly worn on a human body or integrated into a user's clothing or accessory. In some embodiments, the terminal device 120 may further be only a display device, for example, a display. The display may be a flexible display, and the display may further be arranged to be in a non-rectangular irregular shape, that is, a special-shaped display. The display may be a liquid crystal display (LCD), an organic light-emitting diode (OLED) display, or the like. The terminal device 120 may be stationary or mobile.

The terminal device 120 receives the coded data of the plurality of to-be-displayed image frames transmitted by the server 110, performs image rendering based on the coded data of the plurality of image frames, and then displays at least one image frame that is rendered.

For example, the photosensitive sensor 121 arranged on the terminal device 120 is configured to acquire a color signal of the image block on the image frame displayed on the terminal device 120. For example, the photosensitive sensor 121 is in a one-to-one correspondence with the image block in each image frame. In other words, each photosensitive sensor 121 is arranged on a region where an image block is displayed on the display of the terminal device.

Figure 2:
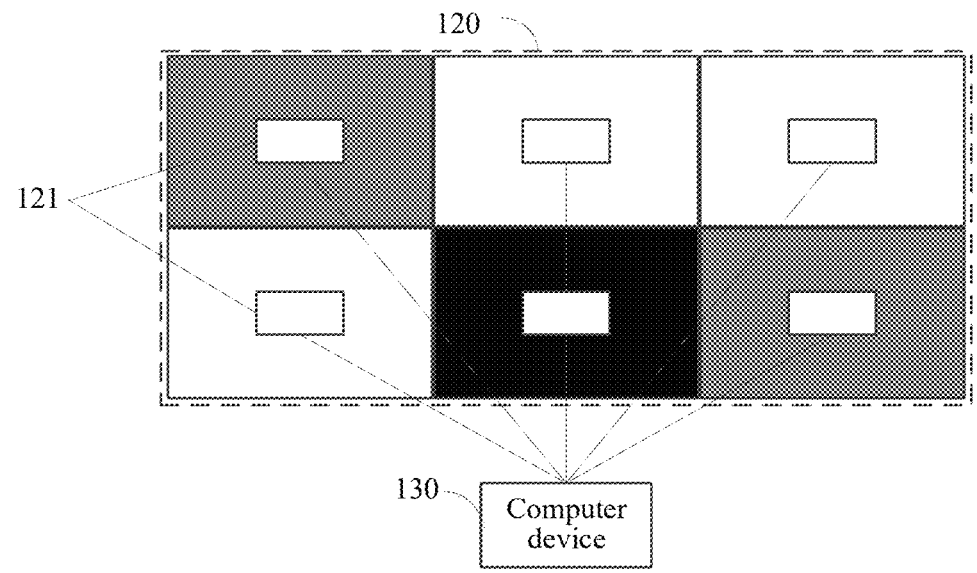
FIG. 2 is a schematic structural diagram of an image frame loss detection system according to an embodiment of this application.

FIG. 2 is a schematic structural diagram of an image frame loss detection system according to an embodiment of this application. As shown in FIG. 2, the image frame displayed on the terminal device 120 includes 6 image blocks. One photosensitive sensor 121 is arranged on a region where each image block is displayed on a display of the terminal device 120. Each photosensitive sensor 121 is connected to the computer device 130 in a wired or wireless manner. Each photosensitive sensor 121 is configured to collect a light signal displayed on the corresponding image block, and convert the light signal to a color signal corresponding to the image block.

In an embodiment, a photosensitive sensor is correspondingly arranged on a region where each image block is displayed on the display of the terminal device. The color signal corresponding to the second image frame includes a color signal corresponding to the image block in the second image frame. The color signal corresponding to the image block is obtained by the corresponding photosensitive sensor by collecting and then converting a light signal displayed on the image block.

It is to be understood that FIG. 2 merely shows an example. Each image frame may include more or fewer image blocks, and a corresponding quantity of photosensitive sensors are arranged according to a quantity of image blocks. In addition, each image block has one color in each image frame, and a region corresponding to each image block has N colors.

With reference to FIG. 1, the computer device 130 receives the coded data corresponding to the at least one rendered image frame transmitted by the terminal device 120. For example, the computer device 130 receives the color signal corresponding to the at least one image frame transmitted by the photosensitive sensor 121, and converts the color signal corresponding to the image frame to corresponding coded data.

This application is specifically described below by using several embodiments.

Figure 3:
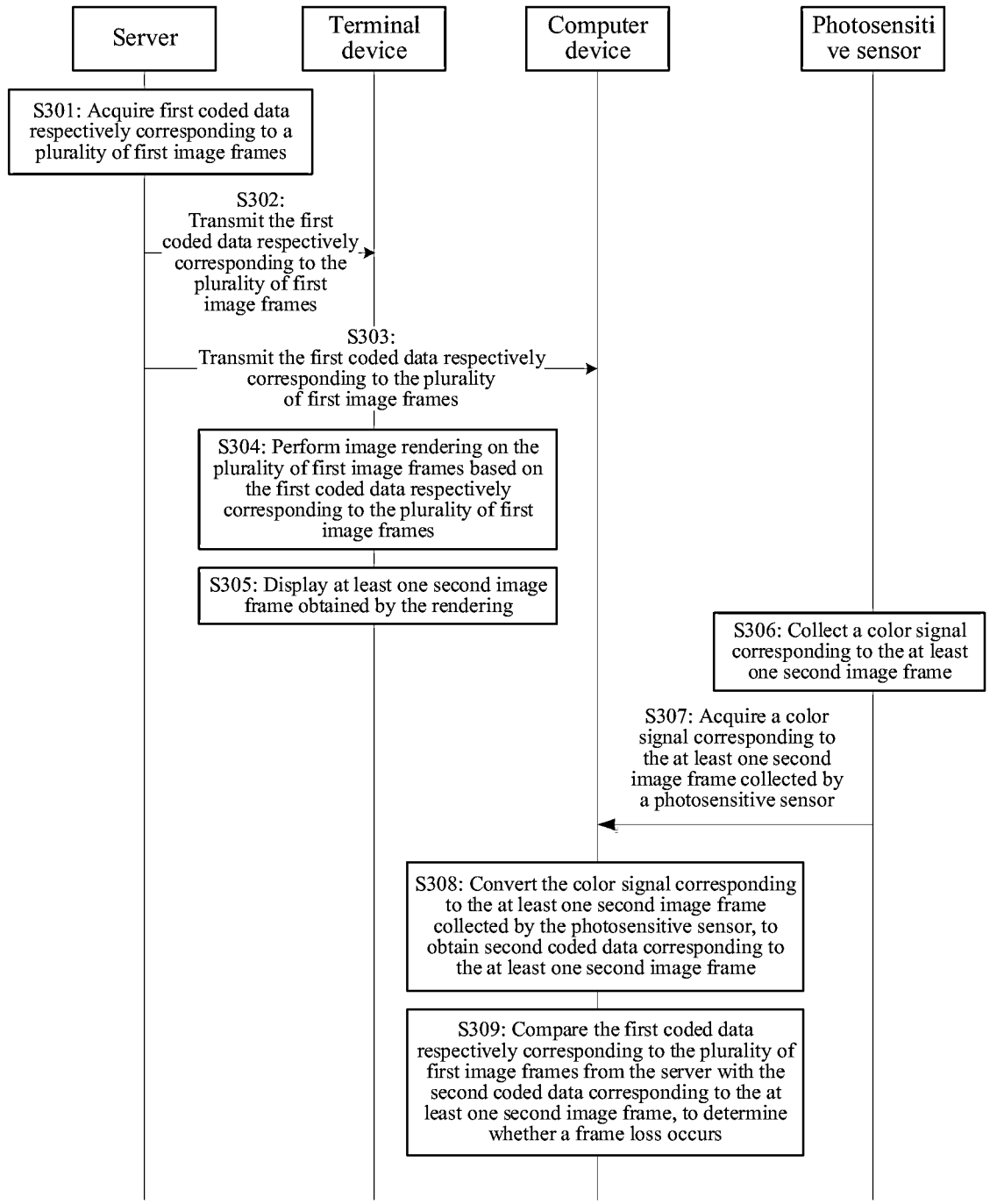
FIG. 3 is a schematic flowchart of an image frame loss detection method according to an embodiment of this application.

FIG. 3 is a schematic diagram of an interactive process of an image frame loss detection method according to an embodiment of this application. As shown in FIG. 3, the method includes the following steps.

S301: A server acquires first coded data respectively corresponding to a plurality of first image frames.

S302: The server transmits the first coded data respectively corresponding to the plurality of first image frames to a terminal device.

S303: The server transmits the first coded data respectively corresponding to the plurality of first image frames to a computer device.

S304: The terminal device performs image rendering on the plurality of first image frames based on the first coded data respectively corresponding to the plurality of first image frames.

S305: The terminal device displays at least one second image frame obtained by the rendering.

S306: A photosensitive sensor collects a color signal corresponding to at least one second image frame.

S307: The computer device acquires a color signal corresponding to the at least one second image frame collected by a photosensitive sensor.

S308: The computer device converts the color signal corresponding to the at least one second image frame collected by the photosensitive sensor, to obtain the coded data corresponding to the at least one second image frame.

S309: The computer device compares the first coded data respectively corresponding to the plurality of first image frames from the server with the second coded data corresponding to the at least one second image frame, to determine whether a frame loss occurs.

The first coded data respectively corresponding to the plurality of first image frames may be generated by the server, or the first coded data respectively corresponding to the plurality of first image frames is received by the server from other servers.

The computer device may also acquire the color signal corresponding to the at least one second image frame in other manners, and it is not limited that the color signal corresponding to the at least one second image frame is required to be collected and transmitted by the photosensitive sensor.

In the conventional method, when there is a relatively small number of colors of the plurality of first image frames transmitted by the server to the terminal device for training in rotation, for example, first image frames of 5 colors including red, blue, yellow, white, and black are transmitted in rotation, after the terminal device renders and displays each of the first image frames, for example, 5 frames are actually lost after the red image frame, in this case, the terminal device still displays the blue image frame. In this way, the computer device cannot detect the frame loss that has occurred. When there is a relatively large number of colors of the plurality of first image frames transmitted by the server to the terminal device for training in rotation is large, there is a small color difference between adjacent first image frames. That is, values of the color signal are similar and prone to overlapping, and the frame loss cannot be accurately detected.

Based on the above, in order to obtain a more accurate detection result and reduce a detection error, in this embodiment of this application, the server may partition each of the plurality of first image frames into M image blocks. Correspondingly, the coded data corresponding to the first image frame includes color-coded data respectively corresponding to the M image blocks, M being an integer greater than 1. It is to be understood that each image block has a color in a first image frame. In an embodiment, a region corresponding to the image block has N color options, N being an integer greater than 1. Therefore, image frames of M*N colors can be trained in rotation in the plurality of first image frames, and it is not necessary to set an excessive quantity of colors. In this way, rich color changes between the plurality of first image frames can be ensured, thereby improving the accuracy of the frame loss detection.

It is to be understood that each color option corresponds to a piece of color-coded data, and the N color options correspond to different color-coded data. In other words, the color options are in a one-to-one correspondence with the color-coded data. For example, the color-coded data corresponding to each color option has a same length, for example, the color-coded data occupies 1 bit.

For example, as shown in FIG. 2, the server partitions the first image frame into 6 image blocks, and the color of the image block is one of 3 color options. In a current image frame, the colors of different image blocks may be the same or different. The server sets the corresponding color-coded data for the image block. For example, the color-coded data corresponding to white is 1, the color-coded data corresponding to red is 2, and the color-coded data corresponding to black is 3. For example, the coded data respectively corresponding to the plurality of first image frames may be a first image frame 111111, a second image frame 11112, a third image frame 111113, a fourth image frame 111121, a fifth image frame 111122, and a sixth image frame 11123.

It is to be understood that when the image frame is partitioned into M image blocks, and a region corresponding to the image block has N color options. In this case, M*N color coding combinations exist, and more image blocks into which the first image frame is partitioned lead to a more accurate result of the image frame loss detection. However, more photosensitive sensors corresponding to the quantity of image blocks lead to higher complexity of collection and computing for the computer device and higher test costs. Specific arrangement may be performed according to an actual application scenario.

Any second image frame is obtained by rendering a first image frame. Therefore, each second image frame includes M image blocks, each image block has a color in the second image frame, and the color of the image block in the second image frame is to be the same as a color of each image block in the corresponding first image frame. For example, a region corresponding to the image block in the second image frame has N color options.

For example, any one of the plurality of first image frames or the at least one second image frame includes 3 or 6 image blocks. The region corresponding to the image block may include 3 color options: black, white, and gray. However, in order to improve the detection accuracy, colors having a large difference between color signals may be assigned, for example, black, white and red, or black, white and blue, and so on.

Steps S304 and S305 are described as follows.

In an embodiment, a rendering frame rate of the terminal device may be 60 frames per second.

It is to be understood that, due to the network jitter, a frame loss may occur to the plurality of first image frames received by the terminal device compared to the plurality of first image frames transmitted by the server. Alternatively, due to the impact of the rendering capability, a frame loss may occur to at least one second image frame obtained by rendering each received image frame by the terminal device compared to the plurality of first image frames transmitted by the server or the plurality of first image frames received by the terminal device.

In an embodiment, the terminal device successively renders, according to a sequence in which the first image frame is received, each image frame based on the first coded data corresponding to the image frame.

In an embodiment, before the terminal device performs image rendering on the plurality of first image frames, the coded data corresponding to the first image frame that is received is decoded to obtain a decoding result, and the image frame is rendered and displayed according to the decoding result.

Step S306 is described as follows.

In the prior art, when information about the image frame rendered by the terminal device is acquired to be compared with the image frame transmitted by the server to determine whether the frame loss occurs, the following two schemes are often used to acquire the information about the image frame. Scheme I: Use a detection tool, such as a log capture tool Systrace provided by the Android system, to capture a system log and obtain a Log of the terminal device, and then analyze the captured Log through a script to obtain the information about the image frame displayed on the terminal device. Scheme II: Continuously capture, through a system command of the terminal device, such as a performance test tool PerfDog, the information about the image frame displayed on the terminal device. However, the detection tool in scheme I is complicated to use, a technician who is very familiar with the system is required to analyze the result, and the analysis process takes a long time, which is not suitable for testing a large number of devices. In scheme II, in consideration of security issues, the system command of the terminal device is trimmed, and the command information cannot be collected on the terminal device, resulting in the failure to detect the frame loss of the terminal device.

In conclusion, the frame loss detection method provided in the related art has the problem of low frame loss detection efficiency. In order to resolve this technical problem, this application may arrange a photosensitive sensor on the terminal device. The color signal of the image frame displayed on the terminal device may be collected by the photosensitive sensor, and the computer device may convert the color signal to obtain the coded data of the image frame. Finally, the coded data of the obtained image frame is compared with the coded data of the image frame obtained from the server, so that the frame loss detection can be realized, and the efficiency of the frame loss detection can be improved.

A photosensitive sensor may be arranged in each of regions corresponding to the M image blocks of the terminal device.

For example, for any second image frame in the foregoing at least one second image frame, the M photosensitive sensors respectively output a color signal of the region corresponding to each image block in the second image frame. The color signal may be a brightness value of at least one second color channel. For example, the color signal is (255, 255, 255).

For step S308, it is to be understood that, in order to determine, through comparison, whether the at least one second image frame rendered and displayed on the terminal device corresponds to the plurality of first image frames transmitted by the server, the color signal corresponding to the at least one second image frame is required to be converted to the second coded data corresponding to the at least one second image frame, so as to perform the frame loss detection by comparing the second coded data corresponding to the at least one second image frame with the first coded data respectively corresponding to the plurality of first image frames transmitted by the server.

For example, the color signal is used for representing a color of each image block. For example, the color is black when the brightness value of a color channel of a grayscale image is 0, the color is white when the brightness value is 255, and the color is gray when the brightness value is 100-150. In another example, a brightness value (0, 0, 0) for three color channels RGB represents black, a brightness value (255, 0, 0) for three color channels RGB represents red, a brightness value (255, 255, 255) for three color channels RGB represents white, and so on.

Further, the color-coded data of each image block may be determined based on the color signal. For example, the color-coded data corresponding to the color signal may be determined according to a correspondence between the color signal and the color-coded data.

For example, when the second image frame is a grayscale image and the brightness value is 255, the corresponding color-coded data is determined as 1. When the brightness value is between 100 and 150, the corresponding color-coded data is determined as 2. When the brightness value is 0, the corresponding color-coded data is determined as 3. Further, the second coded data corresponding to the at least one second image frame is obtained.

For example, it is assumed that the plurality of first image frames and the at least one second image frame each include 6 image blocks, a region corresponding to each image block has 3 color options, and the second coded data corresponding to the at least one second image frame is successively converted to 111111, 11112, and 111123 by using the collected color signal.

For example, during the determination of the corresponding color-coded data based on the color signal in this embodiment, the corresponding color signal may be determined as a corresponding color based on a preset error value. For example, when a color signal having a brightness value differing from 0 by ±10 is determined as white, the corresponding color-coded data is coded data 1 corresponding to white, and 10 is the preset error value. When the quantity of color channels is greater than or equal to 2, each color channel is to be assigned a corresponding error value.

Step S308 is described as follows.

For example, assuming that the second coded data corresponding to the at least one second image frame determined based on the color signal collected by the photosensitive sensor are successively 111111, 11112, 111123, it may be learned, through comparison with the first coded data respectively corresponding to the plurality of first image frames in the foregoing embodiment, that is, the first image frame 111111, the second image frame 11112, the third image frame 111113, the fourth image frame 111121, the fifth image frame 111122, and the sixth image frame 11123, that the second coded data corresponding to the at least one second image frame is the same as the first coded data corresponding to the first image frame, the second image frame, and the sixth image frame among the plurality of first image frames transmitted by the server. That is to say, a total of 3 image frames including the third image frame to the fifth image frame are lost. Therefore, it is determined that the frame loss occurs in the at least one second image frame displayed on the terminal device.

In this embodiment of this application, it is determined, through comparison of the first coded data respectively corresponding to the plurality of first image frames from the server with the second coded data corresponding to the at least one second image frame rendered and displayed on the terminal device, whether the frame loss occurs. The first coded data respectively corresponding to the plurality of first image frames and the second coded data corresponding to the at least one second image frame each include color-coded data respectively corresponding to M image blocks, M being an integer greater than 1, and each image block has a color in the image frame. Since each image frame is partitioned into a plurality of image blocks, during detection of the image frame loss, the problem of low frame loss detection accuracy is not caused due to relatively few image frames for training in rotation.

Further, in this application, the photosensitive sensor may collect the color signal of the at least one image frame, and the coded data corresponding to the at least one image frame is obtained by converting the corresponding color signal. Compared with the solution of determining, through script analysis, whether the frame loss occurs, the technical solution of this application has a relatively simple process, thereby improving the frame loss detection efficiency.

During transmission of the image frame, the frame loss is easily caused due to the impact of the quality of the network or the rendering ability of the terminal device when performing the image rendering. If a relatively small number of frames are lost, there is less impact on watching experience of the user. If a relatively large number of frames are lost, freezing and unsmoothness can be obviously felt, which has great impact on the watching experience of the user.

In order to prevent the user from feeling freezing or unsmoothness during the watching, in this embodiment, the frame loss situation is further analyzed and determined, and it is determined, based on the image frame loss rate and the preset image frame loss rate, whether requirements for the frame rate are satisfied.

Figure 4:
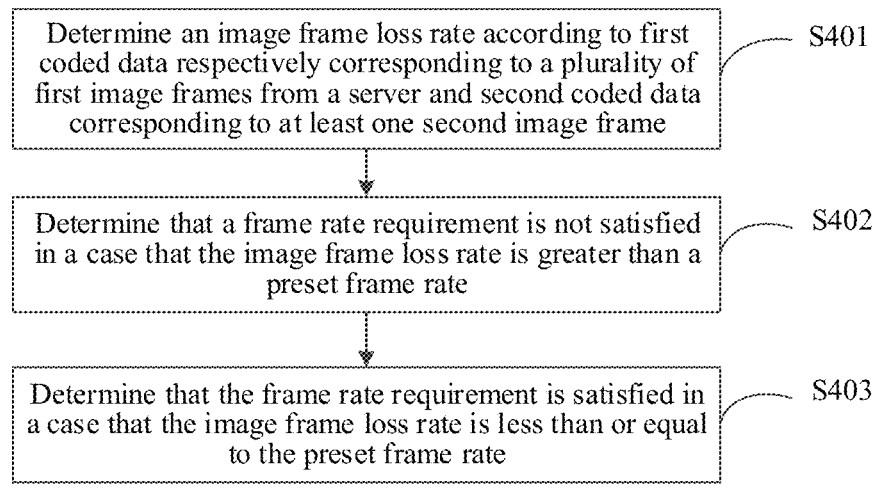
FIG. 4 is a schematic diagram of an interactive process of an image frame loss detection method according to an embodiment of this application.

FIG. 4 is a schematic flowchart of an image frame loss detection method according to an embodiment of this application.

Based on the foregoing embodiment, in this embodiment of this application, after it is determined that the frame loss occurs, it is determined, according to the coded data respectively corresponding to the plurality of image frames and the coded data corresponding to the at least one image frame from the server, whether a frame rate requirement is satisfied. Specifically, the process shown in FIG. 4 is as follows.

S401: A computer device determines an image frame loss rate according to first coded data respectively corresponding to a plurality of first image frames from a server and second coded data corresponding to at least one second image frame.

S402: The computer device determines that a frame rate requirement is not satisfied when the image frame loss rate is greater than a preset image frame loss rate.

S403: The computer device determines that the frame rate requirement is satisfied when the image frame loss rate is less than or equal to the preset image frame loss rate.

For step S401, the computer device may determine, by comparing the first coded data respectively corresponding to the plurality of first image frames with the second coded data corresponding to the at least one second image frame from the server, a quantity of image frames by which the at least one second image frame is less than the plurality of first image frames transmitted by the server. A ratio of the quantity of missing image frames to the quantity of the plurality of first image frames transmitted by the server is used as the image frame loss rate.

It is to be understood that different preset image frame loss rates may be set according to an actual application scenario and a detection requirement. In an embodiment, the preset image frame loss rate is 10%.

Based on any one of the foregoing embodiments, in this embodiment of this application, when it is determined that the frame loss occurs, first indication information for indicating that the frame loss occurs in the at least one second image frame is generated.

In an embodiment, in this embodiment of this application, when it is determined that the frame rate requirement is not satisfied, second indication information for indicating that the frame rate requirement is not satisfied is generated.

In an embodiment, the computer device may transmit the first indication information to any device having a display function to display the first indication information to the user, or the computer device may directly display the first indication information.

In an embodiment, the computer device may transmit the second indication information to any device having a display function to display the second indication information to the user, or the computer device may directly display the second indication information.

In this embodiment of this application, the computer device determines the image frame loss rate according to the first coded data respectively corresponding to the plurality of first image frames and the second coded data corresponding to the at least one second image frame that are from the server. When the image frame loss rate is greater than the preset image frame loss rate, it is determined that the frame rate requirement is not satisfied, and when the image frame loss rate is less than or equal to the preset image frame loss rate, it is determined that the frame rate requirement is satisfied. Identifying whether the frame rate requirement is satisfied helps to effectively identify an impact of a frame rate on the watching experience of the user.

Although the steps in the flowcharts of the embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other sequences. In addition, at least some steps in the flowcharts of the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 5:
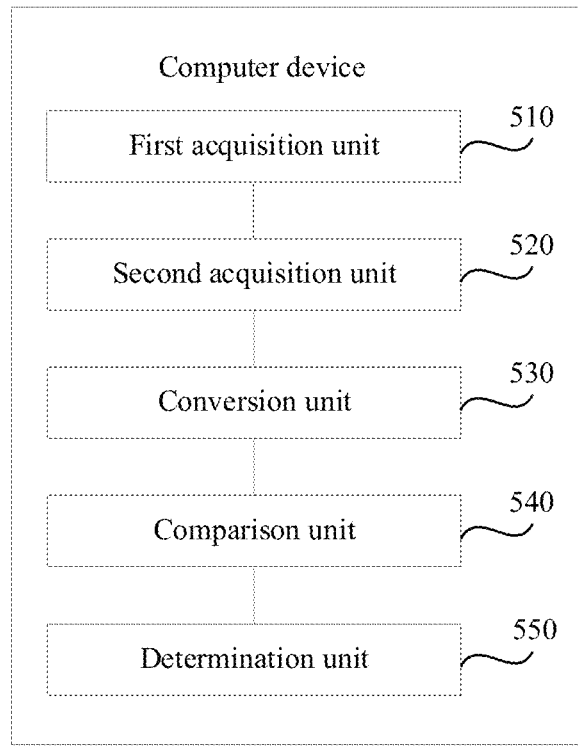
FIG. 5 is a schematic block diagram of a computer device according to an embodiment of this application.
Figure 6:
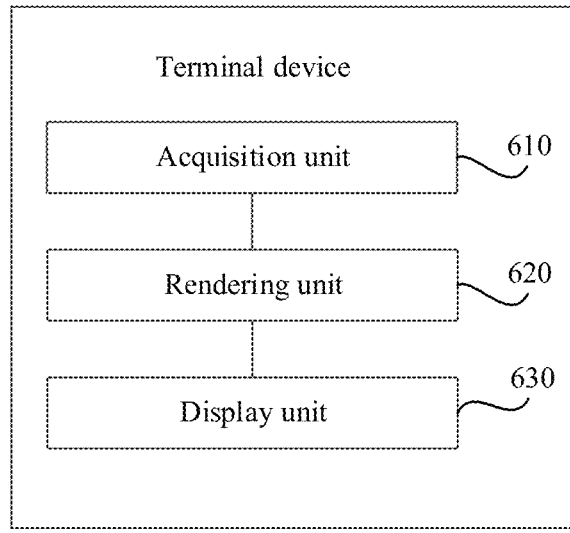
FIG. 6 is a schematic block diagram of a terminal device according to an embodiment of this application.
Figure 7:
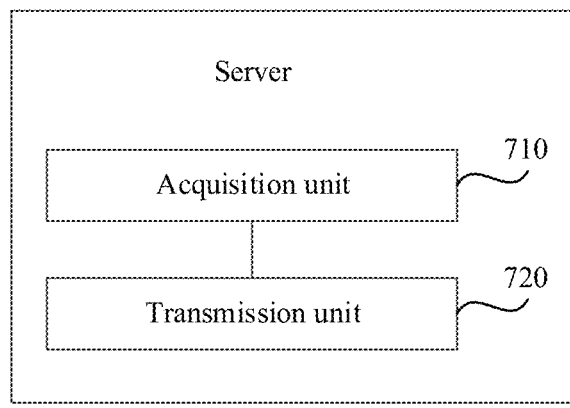
FIG. 7 is a schematic block diagram of a server according to an embodiment of this application.

With reference to FIG. 3 and FIG. 4, the foregoing describes in detail the method embodiments of this application. With reference to FIG. 5 to FIG. 7, the following will describes in detail device embodiments of this application. It is to be understood that, the device embodiments correspond to the method embodiments, and for a similar description, refer to the method embodiments.

FIG. 5 is a schematic block diagram of a computer device according to an embodiment of this application. As shown in FIG. 5, the computer device includes:
- a first acquisition unit 510, configured to acquire first coded data respectively corresponding to a plurality of first image frames;
- a second acquisition unit 520, configured to acquire a color signal corresponding to at least one second image frame, the at least one second image frame being an image frame obtained by a terminal device through image rendering based on the coded data respectively corresponding to the plurality of first image frames;
- a conversion unit 530, configured to convert the color signal corresponding to the at least one second image frame to obtain second coded data corresponding to the at least one second image frame; and
- a comparison unit 540, configured to compare the first coded data respectively corresponding to the plurality of first image frames with the second coded data corresponding to the at least one second image frame, to determine whether a frame loss occurs.

Each of the first image frames and each of the second image frames are partitioned into M image blocks. The first coded data corresponding to the first image frame includes color-coded data corresponding to each of the image blocks in the first image frame. The second coded data corresponding to the second image frame includes color-coded data corresponding to the image block in the second image frame, and M is an integer greater than 1. The each image block has a color in the corresponding image frame.

In an embodiment, a region corresponding to the image block has N color options, N being an integer greater than 1, and a color of the image block is one of the N color options.

In an embodiment, each of the N color options corresponds to a piece of color-coded data, and different color options correspond to different color-coded data.

In an embodiment, the color-coded data corresponding to the N color options has a same length.

In an embodiment, the computer device further includes a determination unit 550, configured to perform a frame rate test according to the first coded data respectively corresponding to the plurality of first image frames and the second coded data corresponding to the at least one second image frame when the comparison unit 540 determines that a frame loss occurs.

In an embodiment, the determination unit 550 is further configured to: determine an image frame loss rate according to the first coded data respectively corresponding to the plurality of first image frames and the second coded data corresponding to the at least one second image frame; determine that a frame rate requirement is not satisfied when the image frame loss rate is greater than a preset image frame loss rate; and determine that the frame rate requirement is satisfied when the image frame loss rate is less than or equal to the preset image frame loss rate.

In an embodiment, the color signal includes a brightness value of at least one color channel.

FIG. 6 is a schematic block diagram of a terminal device 600 according to an embodiment of this application. As shown in FIG. 6, the terminal device 600 includes:
  an acquisition unit 610, configured to acquire first coded data respectively corresponding to a plurality of first image frames;
  a rendering unit 620, configured to perform image rendering on the plurality of first image frames based on the first coded data respectively corresponding to the plurality of first image frames; and
  a display unit 630, configured to: display at least one second image frame obtained by the rendering, and collect a color signal corresponding to each second image frame by using a photosensitive sensor that is arranged; and transmit the color signal corresponding to the at least one second image frame to a computer device, so that the computer device obtains second coded data corresponding to the at least one second image frame based on the color signal, and compare the first coded data respectively corresponding to the plurality of first image frames with the second coded data corresponding to the at least one second image frame, to obtain a frame loss detection result.

Each of the first image frames and each of the second image frames are partitioned into M image blocks. The first coded data corresponding to the first image frame includes color-coded data corresponding to each of the image blocks in the first image frame. The second coded data corresponding to the second image frame includes color-coded data corresponding to the image block in the second image frame, M being an integer greater than 1, and the image block has a color in the image frame.

In an embodiment, a region corresponding to the image block has N color options, N being an integer greater than 1.

In an embodiment, each of the N color options corresponds to a piece of color-coded data, and the N color options correspond to different color-coded data.

In an embodiment, the color-coded data corresponding to the N color options has a same length.

In an embodiment, a photosensitive sensor is arranged on a region corresponding to each image block in the at least one second image frame.

FIG. 7 is a schematic block diagram of a server 700 according to an embodiment of this application. As shown in FIG. 7, the server 700 includes:
  an acquisition unit 710, configured to acquire first coded data respectively corresponding to a plurality of first image frames; and
  a transmission unit 720, configured to: transmit the first coded data respectively corresponding to the plurality of first image frames to a terminal device, so that the terminal device performs image rendering on the plurality of first image frames based on the first coded data respectively corresponding to the plurality of first image frames and displays at least one second image frame obtained by the rendering, and collect a color signal corresponding to the at least one second image frame by a photosensitive sensor arranged in the terminal device during the displaying of each of the second image frames.

The transmission unit 720 is further configured to: transmit the first coded data respectively corresponding to the plurality of first image frames to a computer device, so that the computer device obtains the second coded data corresponding to the at least one second image frame based on the color signal collected by the photosensitive sensor after acquiring the color signal, and compare the first coded data respectively corresponding to the plurality of first image frames with the second coded data corresponding to the at least one second image frame, to obtain a frame loss detection result.

Each of the first image frames and each of the second image frames are partitioned into M image blocks. The first coded data corresponding to the first image frame includes color-coded data corresponding to each of the image blocks in the first image frame. The second coded data corresponding to the second image frame includes color-coded data corresponding to the image block in the second image frame, M being an integer greater than 1, and the image block has a color in the image frame.

In an embodiment, a region corresponding to the image block has N color options, N being an integer greater than 1.

In an embodiment, each of the N color options corresponds to a piece of color-coded data, and the N color options correspond to different color-coded data.

In an embodiment, the color-coded data corresponding to the N color options has a same length.

In an embodiment, the acquisition unit 710 is further configured to: partition each of the plurality of first image frames into M image blocks; code colors of the M image blocks to obtain color-coded data respectively corresponding to the M image blocks; and combine the color-coded data respectively corresponding to the M image blocks to obtain coded data corresponding to the first image frame.

The server provided in the foregoing embodiments may execute the technical solutions on the server side in the foregoing method embodiments. An implementation principle and a technical effect thereof are similar. Details are not described herein again.

Figure 8:
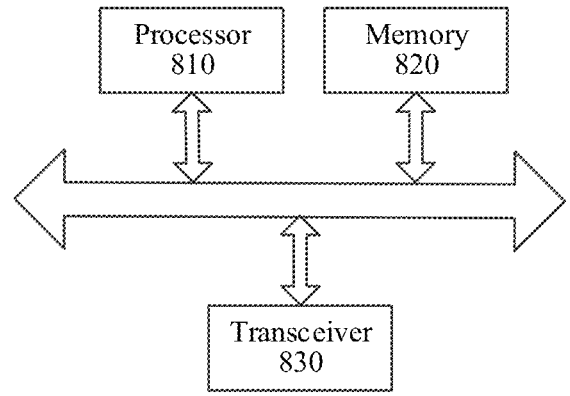
FIG. 8 is a schematic structural diagram of a computer device according to an embodiment of this application.

FIG. 8 is a schematic structural diagram of a computer device 800 according to an embodiment of this application. The computer device shown in FIG. 8 includes one or more processors 810, and the one or more processors 810 can invoke and run computer-readable instructions from a memory, to implement the method in the embodiments of this application.

In an embodiment, as shown in FIG. 8, the computer device 800 may further include a memory 820. The one or more processors 810 may invoke the computer-readable instructions from the memory 820 and run the computer-readable instructions, to implement the method in the embodiments of this application.

The memory 820 may be a component independent of the one or more processors 810, or may be integrated into the one or more processors 810.

In an embodiment, as shown in FIG. 8, the computer device 800 may further include a transceiver 830. One or more processors 810 may control the transceiver 830 to communicate with other devices. Specifically, the transceiver may transmit information or data to other devices, or receive information or data transmitted by other devices.

The transceiver 830 may include a transmitter and a receiver. The transceiver 830 may further include an antenna, and a quantity of the antenna can be one or more.

In an embodiment, the computer device 800 may be a computer device, and may implement a process corresponding to the computer device in the methods of the embodiments of this application.

In an embodiment, the computer device 800 may be a terminal device, and may implement a process corresponding to the terminal device in the methods of the embodiments of this application.

In an embodiment, the computer device 800 may be a server, and may implement a process corresponding to the server in the methods of the embodiments of this application.

It is to be understood that, the one or more processors in this embodiment of this application may be an integrated circuit chip having a signal processing capability. In an implementation process, steps in the foregoing method embodiments can be implemented by using a hardware integrated logical circuit in the one or more processors, or by using instructions in a form of software. The foregoing one or more processors may be one or more general-purpose processors, one or more digital signal processors (DSP), an application-specific integrated circuit (ASIC), a field-programmable gate array (FPGA), or another programmable logic device, discrete gate or transistor logic device, or discrete hardware component. The one or more processors can implement or execute methods, steps, and logical block diagrams disclosed in the embodiments of this application. The one or more general-purpose processors may be one or more microprocessors, or the one or more processors may be any one or more conventional processors and the like. The steps of the methods disclosed with reference to the embodiments of this application may be directly performed and completed by using one or more hardware decoding processors, or may be performed and completed by using a combination of hardware and software modules in the one or more decoding processors. The software module may be stored in a storage medium that is mature in the art, such as a RAM, a flash memory, a read-only memory (ROM), a programmable ROM, an electrically erasable programmable memory, or a register. The storage medium is located in the memory. The one or more processors read information in the memory and complete the steps of the foregoing methods in combination with hardware thereof.

It may be understood that the memory in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus dynamic random access memory (Direct Rambus RAM, DR RAM). The memory in the systems and methods described in this specification is aimed at including but being not limited to these and any memory of another proper type.

It is to be understood that, the memory is an example but is not intended for limitation. For example, the memory in the embodiments of this application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct Rambus random access memory (DR RAM), and the like. That is, the memory described in this embodiment of this application aims to include, but not limited to, the memories and any other suitable types of memories.

An embodiment of this application further provides one or more computer readable storage media, configured to store computer-readable instructions.

In an embodiment, the computer-readable storage media may be applied to the electronic device in the embodiments of this application, and the computer-readable instructions cause a computer to perform corresponding procedures in various methods in the embodiments of this application. For brevity, details are not described herein again.

An embodiment of this application further provides a computer-readable instruction product, including computer-readable instructions.

In an embodiment, the computer program product may be applied to the electronic device in the embodiments of this application, and the computer-readable instructions cause a computer to perform corresponding procedures in the methods in the embodiments of this application. For brevity, details are not described herein again.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but such implementation is not to be considered beyond the scope of this application.

It may be clearly understood by a person skilled in the art that, for the purpose of convenient and brief description, for a detailed working process of the foregoing device, apparatus, and unit, refer to a corresponding process in the foregoing method embodiments, and details are not described herein again.

In the several embodiments provided in this application, it is to be understood that the disclosed device, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and components displayed as units may or may not be physical units, that is, may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. For such an understanding, the technical solutions of this application essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image frame loss detection method performed by a computer device, the method comprising:

acquiring a plurality of first coded data respectively corresponding to a plurality of first image frames, wherein:
  each first coded data corresponds to one respective first image frame of the plurality of first image frames;
  each first image frame of the plurality of first image frames being partitioned into M image blocks, a color of each image block being one of N color options, and each color option of the N color options is assigned a respective distinct single-digit number;
  a respective first coded data corresponding to a respective first image frame comprises color-coded data corresponding to the M image blocks in the plurality of first image frames, M and N being integers greater than 2; and
  the respective first coded data corresponding to the respective frame is a M-digit string of numbers formed by concatenating respective single digit-numbers of the M image blocks of the respective first image frame;

obtaining second coded data corresponding to at least one second image frame generated by a display of a terminal device through image rendering of a color signal based on the plurality of first coded data of the plurality of first image frames, further including:
  partitioning the display into M regions, each region corresponding to a respective image block in the first image frame;
  arranging a plurality of photosensitive sensors on the M regions of the display, each photosensitive sensor corresponding to a respective region in the display; and
  converting the color signal detected by the plurality of photosensitive sensors into color-coded data corresponding to the M regions of the display as the second coded data corresponding to a respective one of the at least one second image frame;

comparing a plurality of M-digit string of numbers corresponding to the plurality of first coded data of the plurality of first image frames with another one or more M-digit string of numbers corresponding to the second coded data of the at least one second image frame, to obtain a frame loss detection result; and generating indication information to be rendered on the terminal device based on the frame loss detection result.

2. The method according to claim 1, wherein each of the N color options corresponds to a piece of color-coded data, and different color options correspond to different color-coded data.

3. The method according to claim 1, wherein the color-coded data corresponding to the N color options has a same length.

4. The method according to claim 1, further comprising:
performing a frame rate test according to the first coded data respectively corresponding to the plurality of first image frames and the second coded data corresponding to the at least one second image frame when the frame loss detection result indicates that a frame loss occurs.

5. The method according to claim 4, wherein the performing a frame rate test according to the first coded data respectively corresponding to the plurality of first image frames and the second coded data corresponding to the at least one second image frame comprises:
determining an image frame loss rate according to the first coded data respectively corresponding to the plurality of first image frames and the second coded data corresponding to the at least one second image frame;
determining that a frame rate requirement is not satisfied when the image frame loss rate is greater than a preset image frame loss rate; and
determining that the frame rate requirement is satisfied when the image frame loss rate is less than or equal to the preset image frame loss rate.

6. A computer device, comprising:
one or more processors; and
a memory, the memory being configured to store computer-readable instructions, the one or more processors being configured to invoke and run the computer-readable instructions stored in the memory and cause the computer-readable instructions to perform an image frame loss detection method including:
acquiring a plurality of first coded data respectively corresponding to a plurality of first image frames, wherein:
each first coded data corresponds to one respective first image frame of the plurality of first image frames;
each first image frame of the first image frames being partitioned into M image blocks, a color of each image block being one of N color options, and each color option of the N color options is assigned a respective distinct single-digit number;
a respective first coded data corresponding to a respective first image comprises color-coded data corresponding to the M image blocks in the plurality of first image frames, M and N being integers greater than 2; and
the respective first coded data corresponding to the respective frame is a M-digit string of numbers formed by concatenating respective single digit-numbers of the M image blocks of the respective first image frame;
obtaining second coded data corresponding to at least one second image frame generated by a display of a terminal device through image rendering of a color signal based on the plurality of first coded data of the plurality of first image frames, further including:
partitioning the display into M regions, each region corresponding to a respective image block in the first image frame;
arranging a plurality of photosensitive sensors on the M regions of the display, each photosensitive sensor corresponding to a respective region in the display; and
converting the color signal detected by the plurality of photosensitive sensors into color-coded data corresponding to the M regions of the display as the second coded data corresponding to a respective one of the at least one second image frame;
comparing a plurality of M-digit string of numbers corresponding to the plurality of first coded data of the plurality of first image frames with another one or more M-digit string of numbers corresponding to the second coded data of the at least one second image frame, to obtain a frame loss detection result; and
generating indication information to be rendered on the terminal device based on the frame loss detection result.

7. The computer device according to claim 6, wherein each of the N color options corresponds to a piece of color-coded data, and different color options correspond to different color-coded data.

8. The computer device according to claim 6, wherein the color-coded data corresponding to the N color options has a same length.

9. The computer device according to claim 6, wherein the method further comprises:
performing a frame rate test according to the first coded data respectively corresponding to the plurality of first image frames and the second coded data corresponding to the at least one second image frame when the frame loss detection result indicates that a frame loss occurs.

10. The computer device according to claim 9, wherein the performing a frame rate test according to the first coded data respectively corresponding to the plurality of first image frames and the second coded data corresponding to the at least one second image frame comprises:
determining an image frame loss rate according to the first coded data respectively corresponding to the plurality of first image frames and the second coded data corresponding to the at least one second image frame;
determining that a frame rate requirement is not satisfied when the image frame loss rate is greater than a preset image frame loss rate; and
determining that the frame rate requirement is satisfied when the image frame loss rate is less than or equal to the preset image frame loss rate.

11. One or more non-transitory computer-readable storage media, configured to store computer-readable instructions, the computer-readable instructions, when executed by a processor of a computer device, causing the computer device to perform an image frame loss detection method including:
acquiring a plurality of first coded data respectively corresponding to a plurality of first image frames, wherein:
each first coded data corresponds to one respective first image frame of the plurality of first image frames;
each first image frame of the first image frames being partitioned into M image blocks, a color of each image block being one of N color options, and each color option of the N color options is assigned a respective distinct single-digit number;
a respective first coded data corresponding to a respective first image comprises color-coded data corresponding to the M image blocks in the plurality of first image frames, M and N being integers greater than 2; and
the respective first coded data corresponding to the respective frame is a M-digit string of numbers formed by concatenating respective single digit-numbers of the M image blocks of the respective first image frame;
obtaining second coded data corresponding to at least one second image frame generated by a display of a terminal device through image rendering of a color signal based on the plurality of first coded data of the plurality of first image frames, further including:
  partitioning the display into M regions, each region corresponding to a respective image block in the first image frame;
  arranging a plurality of photosensitive sensors on the M regions of the display, each photosensitive sensor corresponding to a respective region in the display; and
  converting the color signal detected by the plurality of photosensitive sensors into color-coded data corresponding to the M regions of the display as the second coded data corresponding to a respective one of the at least one second image frame;
comparing a plurality of M-digit string of numbers corresponding to the plurality of first coded data of the plurality of first image frames with another one or more M-digit string of numbers corresponding to the second coded data of the at least one second image frame, to obtain a frame loss detection result; and
generating indication information to be rendered on the terminal device based on the frame loss detection result.

12. The non-transitory computer-readable storage media according to claim 11, wherein each of the N color options corresponds to a piece of color-coded data, and different color options correspond to different color-coded data.

13. The non-transitory computer-readable storage media according to claim 11, wherein the color-coded data corresponding to the N color options has a same length.

14. The non-transitory computer-readable storage media according to claim 11, wherein the method further comprises:
  performing a frame rate test according to the first coded data respectively corresponding to the plurality of first image frames and the second coded data corresponding to the at least one second image frame when the frame loss detection result indicates that a frame loss occurs.

15. The non-transitory computer-readable storage media according to claim 14, wherein the performing a frame rate test according to the first coded data respectively corresponding to the plurality of first image frames and the second coded data corresponding to the at least one second image frame comprises:
  determining an image frame loss rate according to the first coded data respectively corresponding to the plurality of first image frames and the second coded data corresponding to the at least one second image frame;
  determining that a frame rate requirement is not satisfied when the image frame loss rate is greater than a preset image frame loss rate; and
  determining that the frame rate requirement is satisfied when the image frame loss rate is less than or equal to the preset image frame loss rate.

* * * * *